United States Patent [19]

Matsumoto et al.

[11] Patent Number: 5,060,082

[45] Date of Patent: Oct. 22, 1991

[54] FACSIMILE APPARATUS

[75] Inventors: Masafumi Matsumoto, Takaichi; Masafumi Yamanoue, Yao; Hiroshi Morimoto, Sakurai, all of Japan

[73] Assignee: Sharp Kabushiki Kaisha, Osaka, Japan

[21] Appl. No.: 497,011

[22] Filed: Mar. 20, 1990

[30] Foreign Application Priority Data

Mar. 24, 1989 [JP] Japan .................. 64-72146

[51] Int. Cl.$^5$ .............................. H04N 1/40
[52] U.S. Cl. .................... 358/447; 358/451; 358/445; 358/296; 382/50; 382/54
[58] Field of Search ............... 358/296, 448, 447, 451; 382/50, 54

[56] References Cited

U.S. PATENT DOCUMENTS

| | | | |
|---|---|---|---|
| 4,571,635 | 2/1986 | Mahmodi et al. | 382/54 |
| 4,651,223 | 3/1987 | Sasaki et al. | 358/447 |
| 4,682,869 | 7/1987 | Itoh et al. | 358/447 |
| 4,855,841 | 8/1989 | Shimada | 358/296 |
| 4,873,577 | 10/1989 | Chamzas | 358/447 |
| 4,937,682 | 6/1990 | Dalton | 358/447 |

FOREIGN PATENT DOCUMENTS 61-242467 10/1986 Japan .

Primary Examiner—Edward L. Coles, Sr.
Attorney, Agent, or Firm—David G. Conlin; Robert M. Asher

[57] ABSTRACT

A facsimile apparatus including image data conversion unit for converting image data corresponding to an image to be printed in such a manner that two adjacent dots on a main scanning line of the image data are converted into one dot a smoothing unit connected to the conversion unit for modifying converted image data in such a manner that, if a pattern of a region formed by a predetermined number of converted dots coincides with a predetermined pattern, the converted image data is changed to have a pattern corresponding to the predetermined pattern in the region; and selection unit connected to the image data conversion unit and the smoothing unit and adapted to select an output of the image data conversion unit as printing data if it is detected that the image data has been transmitted in a fine mode, and select an output of the smoothing unit as printing data if it is detected that the image data has been transmitted in a standard mode.

5 Claims, 3 Drawing Sheets

- ▨ DATA RECEIVED IN STD MODE
- ▩ PRINTING DATA BY REPETITION
- ▦ ADDITIONAL DOT FOR SMOOTHING
- ▢ ELIMINATED DOT FOR SMOOTHING

- ▨ DATA RECEIVED IN STD MODE
- ▩ PRINTING DATA BY REPETITION

FACSIMILE APPARATUS

BACKGROUND OF THE INVENTION (1) Field of the Invention

The present invention relates to a facsimile apparatus provided with a printing head having a low line density.

(2) Description of the Related Art

A typical facsimile of thermal printing type comprises a thermal head having a line density of eight lines per millimeter. Since the facsimile of this type is capable of printing an image in high density, it can be used for receiving minute images such as drawings. Therefore, it has been widely used for business use.

On the other hand, in the facsimile transmission system, there are two transmission modes: a fine mode; and a standard mode. The fine mode is a mode in which a transmitting side transmits image data for every line, and the receiving side prints the received image data for every line. In the standard mode, the image data on one line is transmitted for two lines, and in the receiving side, the same received image data is printed on the first line and the second line. Therefor, although the standard mode has an advantage that the data transmitting time can be reduced by half compared to the fine mode, it has a disadvantage in terms of deterioration in image quality.

Recently, facsimiles have been coming into wide domestic use. For domestic use, a high density thermal head is needless since the images to be facsimiled are handwritten letters or characters in most cases. The high density thermal head requires a large number of driver circuits, causing the overall cost to become high. Therefore, a facsimile for domestic use is generally provided with a low density thermal head.

In such a facsimile for domestic use provided with a low density thermal head having line density of 4 lines per millimeter for example, image data for two adjacent dots in the main scanning direction (in the horizontal direction) of the received image data transmitted corresponding to the high line density of 8 lines per millimeter is converted into image data for one dot.

If the above-described conversion is performed for the fine mode, the resolution is reduced by half compared to that obtained by using the thermal head having line density of 8 lines per millimeter. It does not matter for domestic use. However, if the above conversion is performed for the standard mode, the resolution of the image is further reduced to a quarter, therefore, there arises a problem that a step-like notched shape peculiar to a digital image transmission system appears.

SUMMARY OF THE INVENTION

It is therefore an object of the present invention to provide a facsimile apparatus capable of printing image data smoothly by a printing head having low line density.

The object of the present invention can be achieved by a facsimile apparatus comprising:

image data conversion means for converting image data corresponding to an image to be printed in such a manner that two adjacent dots on a main scanning line of said image data are converted into one dot;

smoothing means connected to said conversion means for modifying converted image data in such a manner that, if a pattern of a region formed by a predetermined number of converted dots coincides with a predetermined pattern, said converted image data is changed to have a pattern corresponding to said predetermined pattern in said region; and selection means connected to said image data conversion means and said smoothing means and adapted to select an output of said image data conversion means as printing data if it is detected that said image data has been transmitted in a fine mode, and select an output of said smoothing means as printing data if it is detected that said image data has been transmitted in a standard mode.

According to the present invention, a smoothly printed image can be obtained in the standard mode compared to a conventional facsimile apparatus provided with a printing head having a low line density.

Further objects and advantages of the present invention will be apparent from the following description, reference being had to the accompanying drawings wherein preferred embodiment of the present invention is clearly shown.

DESCRIPTION OF THE PREFERRED EMBODIMENT

Figure 1:
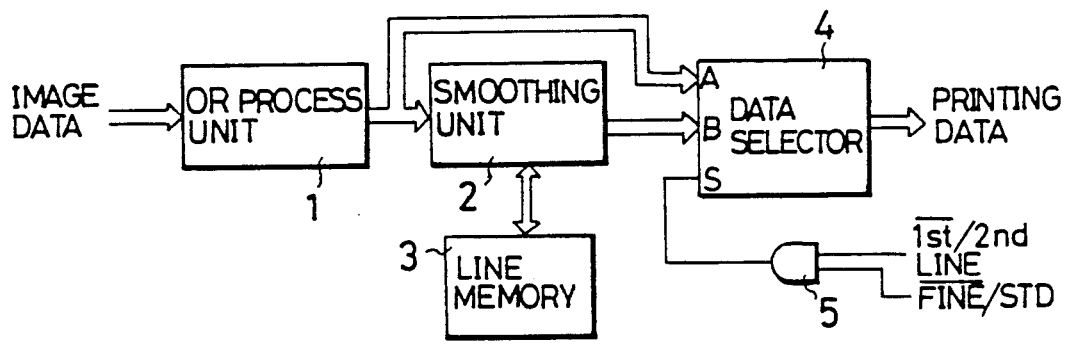
FIG. 1 is a block diagram of an embodiment of a facsimile apparatus according to the present invention.

FIG. 1 illustrates the structure of a facsimile apparatus according to the present invention. In FIG. 1, there are shown an OR-process unit 1, a smoothing process unit 2, a line memory 3, a data selector 4, and an AND gate circuit 5.

The OR process unit 1 performs an OR-process on image data for adjacent two dots in the main scanning direction of the received image data in order to convert them into image data for one dot. The smoothing process unit 2 subjects the image data converted by the OR-process unit 1 to a smoothing process described later. The line memory 3 temporarily stores the image data to be subjected to the smoothing process. In the fine mode, the data selector 4 outputs the image data which has been converted by the OR process unit 1 as it is. In the standard mode, the data selector 4 outputs an output of the smoothing process unit 2 as printing data. The AND gate circuit 5 generates a signal for distinguishing a state where the image data has been transmitted and received in the standard mode and the printing data is for the second line from other states, and supplies the generated signal to the data seletor 4.

Figure 2:
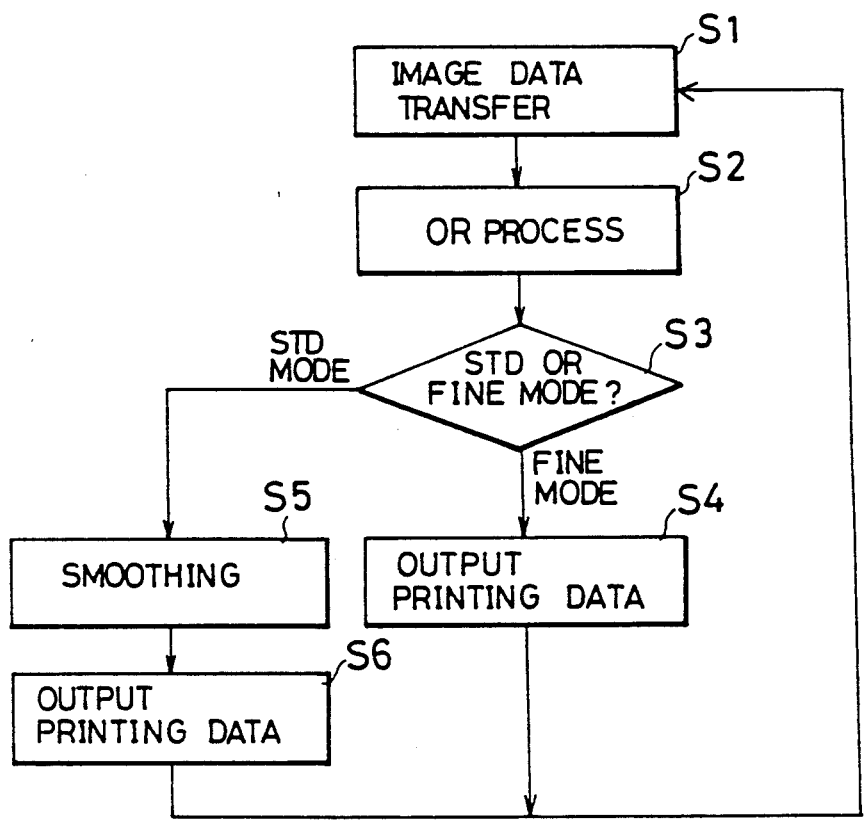
FIG. 2 is a flow chart for explaining the operation of the facsimile apparatus of FIG. 1.
Figure 3A:
FIGS. 3a to 3d are views for explaining algorithms of smoothing process.
Figure 3B:
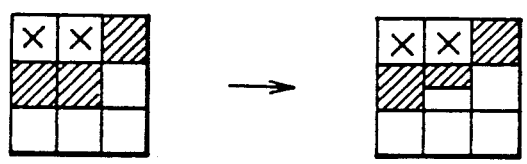
Figure 3C:
Figure 3D:

The operation of the facsimile apparatus of this embodiment will now be explained with reference to FIG. 2.

First, image data to be recorded is transferred to the OR process unit 1 (step S1). The OR process unit 1 converts the two adjacent dots into one dot by the OR process (step S2). If it is detected that the image data has been transmitted in the fine mode (step S3), each converted dot for one line is sent out a printing data for one line (step S4). If it is detected that the image data has been transmitted in the standard mode (step S3), image data for a plurality of lines (main scanning lines) are stored in the line memory 3 in order to detect a dot pattern for each region constituted by a predetermined number of dots. If the detected dot pattern coincides with one of predetermined reference patterns, it is converted into the corresponding pattern for the purpose of smoothing (step S5).

The image data for a plurality of lines stored in the line memory are converted by the smoothing process unit 2 by the above-described method, and successively sent out as printing data (step S6).

FIGS. 3a to 3d illustrate examples of algorithms employed for the smoothing process. In these Figures, hatched squares represent portions to be printed in black, blank squares represent portions to be printed in white, and squares each having a cross represent portions which may be printed in either white or black. When detected dot pattern is the pattern shown on the left of FIG. 3a, for example, it is converted into the pattern shown on the right of FIG. 3a.

In a conventional facsimile apparatus, if the image data of a square is on black level for the first line, the image data of this square for the second line is made on the black level. As a result, the whole of the square is made black. According to the facsimile apparatus of this embodiment, since the level conversion (white-black conversion) of data is performed in accordance with the detected pattern, if the data for the first line is on the black (or white) level, the data for the second line is not always made on the black (or white) level. For example, as shown on the right of FIGS. 3a to 3c, the upper half portion of each square positioned at each center of the regions is black (or white), and the lower half portion of the same is white (or black).

Figure 4A:
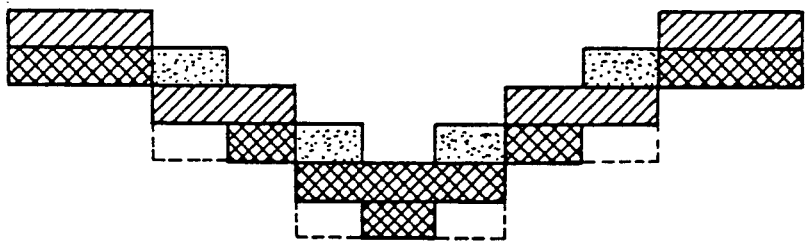
FIGS. 4a and 4b are views showing examples of printed patterns in a case the smoothing process has been performed and a case it has not been performed.
Figure 4B:
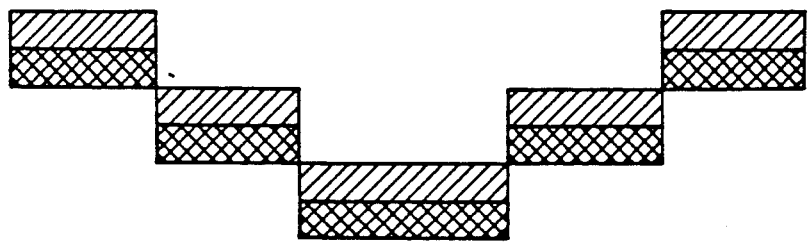

FIG. 4a illustrates a printed pattern obtained by performing the smoothing process. FIG. 4b illustrates a printed pattern obtained by simply printing the same data twice for the first and second lines as in the conventional method. It will be understood by comparing these two patterns that a smoothly printed pattern can be obtained by the smoothing process.

Many widely different embodiments of the present invention may be constructed without departing from the spirit and scope of the present invention. It should be understood that the present invention is not limited to the specific embodiment described in this specification, except as defined in the appended claims.

What is claimed is:

1. A facsimile apparatus comprising:
   image data conversion means for converting image data corresponding to an image to be printed in such a manner that two adjacent dots on a main scanning line of said image data are converted into one dot;
   smoothing means connected to said conversion means for modifying converted image data in such a manner that, if a pattern of a region formed by a predetermined number of converted dots coincides with a predetermined pattern, said converted image data is changed to have a pattern corresponding to said predetermined pattern in said region; and
   selection means connected to said image data conversion means and said smoothing means and adapted to select an output of said image data conversion means as printing data if it is detected that said image data has been transmitted in a fine mode, and select an output of said smoothing means as printing data if it is detected that said image data has been transmitted in a standard mode.

2. A facsimile apparatus according to claim 1, wherein said image data conversion means converts two adjacent dots on the main scanning line into one dot on black level if at least one of said two adjacent dots is on the black level.

3. A facsimile apparatus according to claim 1, wherein said smoothing means comprises a line memory for temporarily storing converted image data on a plurality of main scanning lines.

4. A facsimile apparatus according to claim 1 further comprising a thermal head having line density of four lines per millimeter, said thermal head being connected to said selection means.

5. A facsimile apparatus according to claim 1, wherein said region is a square comprising nine dots.

* * * * *

UNITED STATES PATENT AND TRADEMARK OFFICE
CERTIFICATE OF CORRECTION

PATENT NO. : 5,060,082

DATED : October 22, 1991

INVENTOR(S) : Masafumi Matsumoto, Masafumi Yamanoue, Hiroshi Morimoto

It is certified that error appears in the above-identified patent and that said Letters Patent is hereby corrected as shown below:

On the title page, Item [30]
Under Foreign Application Priority Data, please delete "64-72146"

and insert --1-72146--.

Signed and Sealed this

Ninth Day of March, 1993

Attest:

STEPHEN G. KUNIN

*Attesting Officer*     *Acting Commissioner of Patents and Trademarks*